United States Patent [19]

Kinnick et al.

[11] Patent Number: 4,886,101

[45] Date of Patent: Dec. 12, 1989

[54] WHEEL/TIRE LOAD SIMULATING APPARATUS

[75] Inventors: John F. Kinnick, Troy; Chester P. Kozlowski, Royal Oak, both of Mich.

[73] Assignee: Dominion Tool & Die Company, Inc., Roseville, Mich.

[21] Appl. No.: 73,170

[22] Filed: Jul. 13, 1987

[51] Int. Cl.$^4$ ............................................. B60C 25/06
[52] U.S. Cl. ...................................... 157/1.22; 157/1; 157/1.21
[58] Field of Search ................ 157/1.0, 1.1, 1.2, 1.21, 157/1.22, 1.24, 14, 20, 21, 13; 51/DIG. 33; 73/146, 117

[56] References Cited

U.S. PATENT DOCUMENTS

| | | |
|---|---|---|
| 2,825,395 | 3/1958 | Twiford . |
| 3,656,343 | 4/1972 | Braden et al. ............................ 73/146 |
| 3,658,110 | 4/1972 | Koziar . |
| 3,760,633 | 9/1973 | Skidmore . |
| 3,851,697 | 12/1974 | Nishimura ............................ 157/13 |
| 3,970,342 | 7/1976 | Cotton . |
| 3,973,615 | 8/1976 | Cunha . |
| 4,016,020 | 4/1977 | Ongaro . |
| 4,083,394 | 4/1978 | Heikkinen et al. . |
| 4,166,493 | 9/1979 | Bosen . |
| 4,302,966 | 12/1981 | Ohnishi et al. . |
| 4,433,578 | 2/1984 | Hill .................................. 157/21 X |
| 4,658,656 | 4/1987 | Haeg . |

FOREIGN PATENT DOCUMENTS

| | | |
|---|---|---|
| 0063245 | of 0000 | European Pat. Off. . |
| 0095206 | 6/1982 | Japan ..................................... 157/1.1 |
| 0606748 | 5/1978 | U.S.S.R. ............................. 157/1.21 |
| 1495313 | 12/1977 | United Kingdom . |
| 1508822 | 4/1978 | United Kingdom . |
| 2104010A | 3/1983 | United Kingdom . |
| 2104460 | 3/1983 | United Kingdom .................... 157/1 |

Primary Examiner—D. S. Meislin
Attorney, Agent, or Firm—Harness, Dickey & Pierce

[57] ABSTRACT

There is disclosed herein load simulating apparatus for use in applying a load to a mounted and inflated wheel/tire assembly in order to insure proper and complete seating of the tire bead on the vehicle rim. The load simulating apparatus of the present invention incorporates a plurality of pivotably mounted driven rollers which are operable to move into engagement with the peripheral tread portion of the tire and to accelerate same while applying a generally radially inwardly directed force thereto so as to simulate the loading on the tire typically encountered after the wheel/tire assembly is mounted on a vehicle. Preferably, the load simulating apparatus of the present invention will be incorporated in a wheel/tire assembly line and located prior to the balancing machine so as to insure proper and complete seating of the tire bead before the assembly is balanced. It has been found that subjecting the wheel/tire assembly to a loading prior to balancing results in greater accuracy in the balancing process as well as a general overall reduction in the weight required to achieve proper balancing.

25 Claims, 5 Drawing Sheets

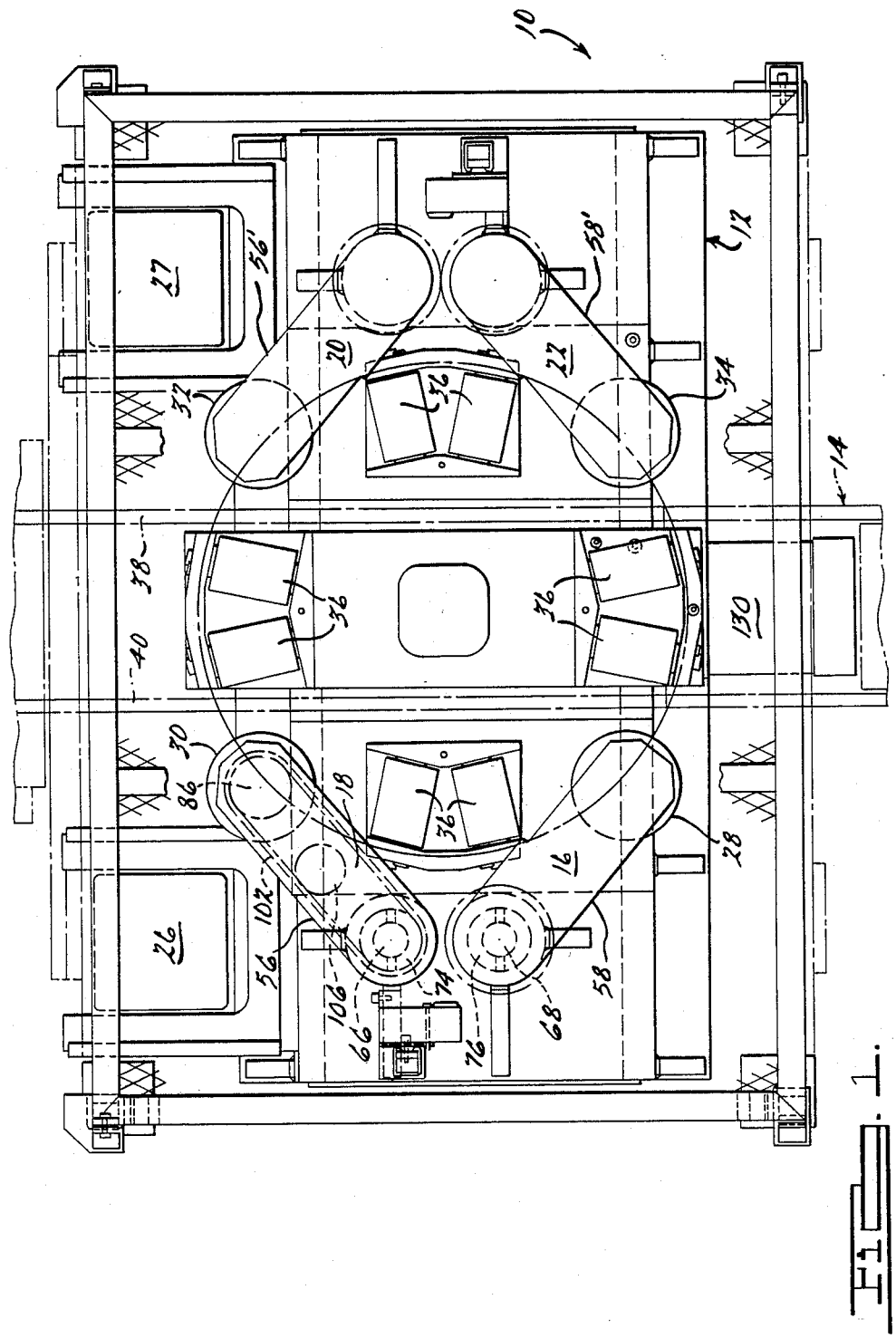

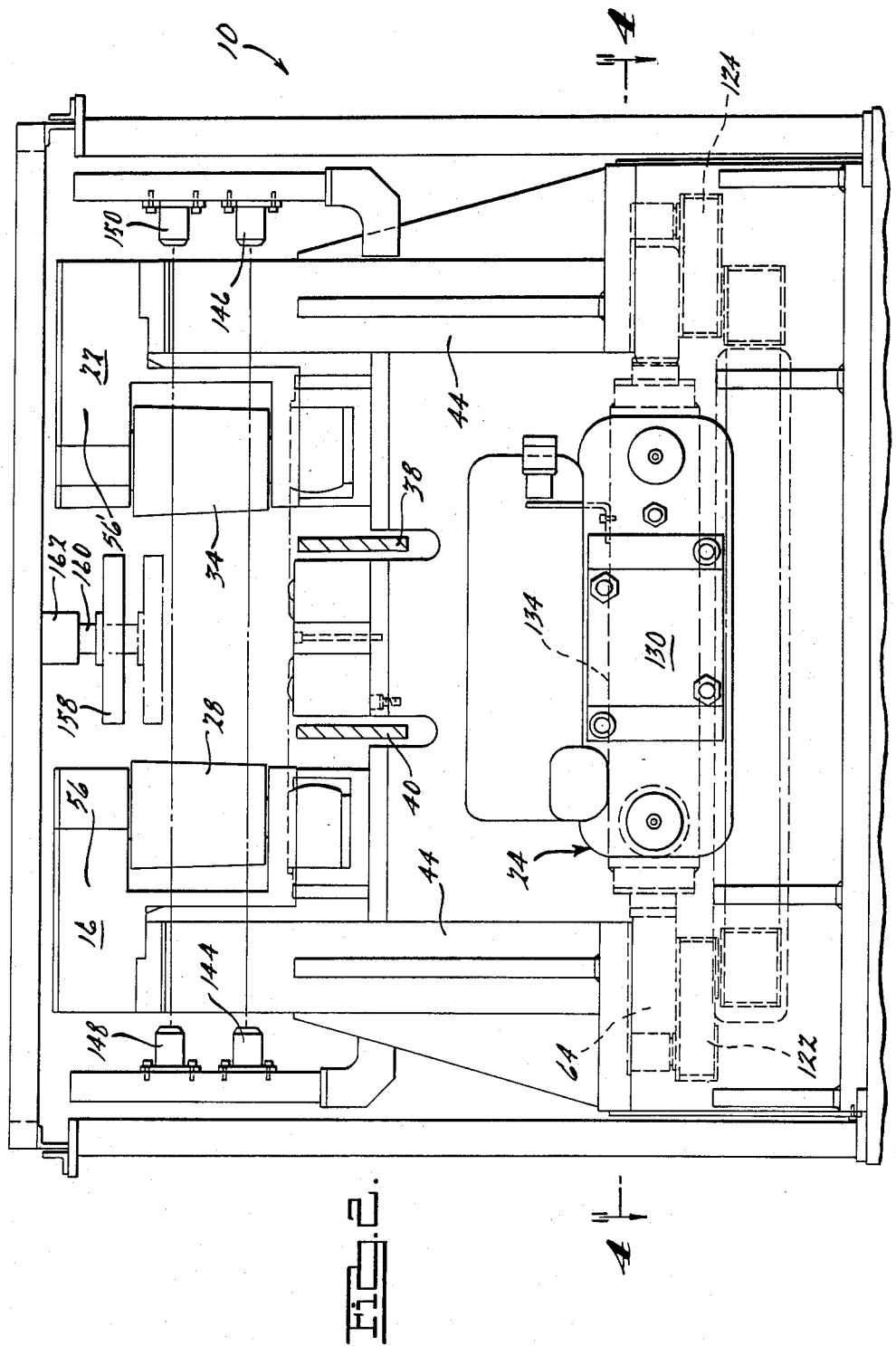

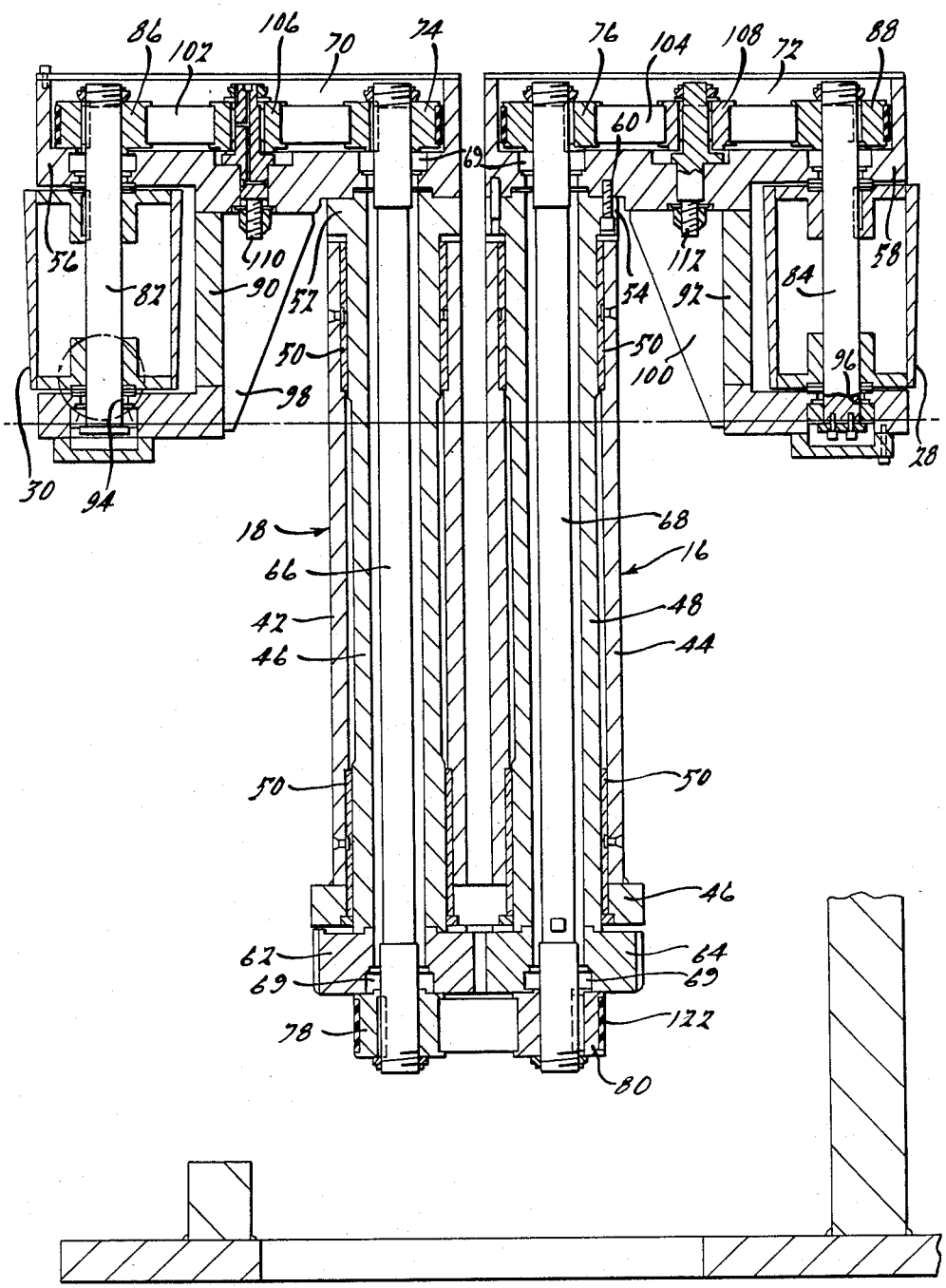

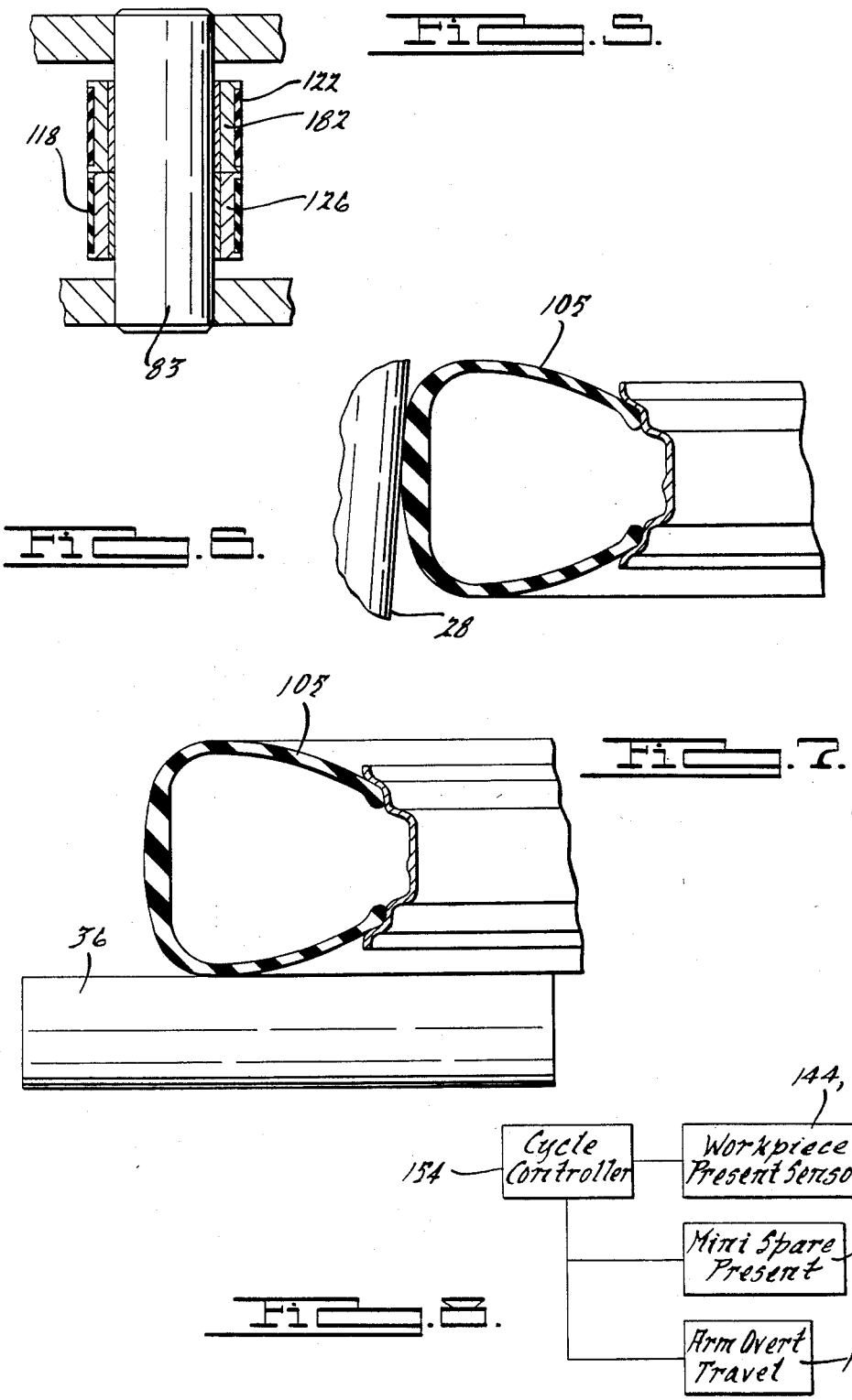

WHEEL/TIRE LOAD SIMULATING APPARATUS

BACKGROUND AND SUMMARY OF THE INVENTION

The present invention relates generally to load simulators and more specifically to apparatus for applying a radially inwardly directed load on a wheel/tire assembly as the wheel/tire assembly is rotated.

Most modern day automotive assembly plants incorporate one or more wheel/tire assembly lines which operate to receive vehicle wheels and vehicle tires, mount the tires on the wheels and inflate same in preparation for mounting of the wheel/tire assemblies on the motor vehicles. Typically, these assembly lines will incorporate various items of automated equipment such as apparatus for soaping the wheel and/or tire, mounting the tire on the wheel, inflating same and finally balancing the mounted and inflated tire. The balancing apparatus incorporated in such tire lines is extremely effective in accurately balancing the wheel/tire assembly as it comes off the tire line. However, in many cases, it has been discovered that the wheel/tire assembly is out of balance after the vehicle has been driven only a very short distance. It is believed that the reason for this imbalance after a very short driving period is the fact that the tire beads do not fully seat against the rim in all cases during the mounting process. Once the vehicle has been driven even a relatively short distance with the weight of the vehicle bearing thereon, the flexing movement of the sidewall and slight warming of the tire result in complete seating of the tire bead. There are many reasons why the tire bead may not fully seat initially such as for example the fact that the tires are often somewhat distorted as received by the tire line due to the manner in which they are shipped and stored. Other factors such as a build up of tolerances or the like may result in one tire fitting relatively tightly on a particular rim and hence inhibiting the complete seating movement of the bead during the inflation process.

In any event, whatever the cause, the out of balance tires then often require warranty work to be performed either within the assembly plant prior to shipment of the vehicle to a dealer or alternatively by the dealer in order to bring the tires back into accurate balanced condition. Not only does this represent a relatively costly process in that it requires a second performance of the balancing operation, it is particularly disconcerting when the condition is discovered as a result of a customer complaint. Further, it has been noted that many wheel/tire assemblies when rebalanced require application of substantially less weight than utilized in the initial balancing in order to bring them into specification. Hence, it is exceedingly desirable to eliminate this problem both from a customer satisfaction viewpoint as well as for the labor and material cost savings which may be realized thereby.

In order to overcome these problems, the present invention has been developed which is designed to be incorporated as an additional unit within a wheel/tire assembly line and to be located between the inflator station and the balancing station. The present invention incorporates a plurality of power driven pivotable arms which are operable to move into engagement with the periphery of a mounted and inflated tire and to rotatably drive the tire up to a predetermined speed while simultaneously applying a load thereto and thereafter to decelerate the tire and advance the wheel/tire assembly into the balance station. The running up to a predetermined speed of the wheel/tire assembly while simultaneously applying a radially inwardly directed force thereon operates to effectively simulate the conditions encountered during the initial operation of the vehicle and thereby effectively seat the beads completely on the tire rim. It is believed that the use of this apparatus not only will significantly reduce the number of vehicle wheel assemblies requiring rebalancing after a short driving distance but also will achieve the additional benefit of a substantial reduction in the amount of weight which must be applied to the various wheel/tire assemblies in order to achieve the proper balancing thereof. Thus, the present invention offers substantial cost savings in eliminating or substantially reducing the amount of rebalancing required as well as reducing the cost attributable to the consumption of balancing weights.

Additional advantages and features of the present invention will become apparent from the subsequent description and the appended claims taken in conjunction with the accompanying drawings.

BRIEF DESCRIPTION OF THE DRAWINGS

FIG. 1 is a top plan view of a load simulating apparatus in accordance with the present invention;

FIG. 3 is an enlarged fragmentary section view of a portion of the load simulating apparatus of FIG. 1 illustrating the drive arrangement incorporated therein for effecting both pivotable and rotational movement of the driving rollers;

FIG. 4 is a section view of the load simulating apparatus illustrated in FIGS. 1 and 2, the section being taken generally along the line 4—4 of FIG. 2;

FIG. 5 is an enlarged section view of a portion of the load simulating apparatus shown in FIG. 3, the section being taken along lines 5—5 thereof;

FIG. 6 is a fragmentary view of a portion of the load simulating apparatus of the present invention partially in section showing the engagement of the driving rollers with the periphery of the tire;

FIG. 7 is a fragmentary view of a portion of the load simulating apparatus of the present invention also partially in section and showing the relationship between the supporting rollers and wheel/tire assembly; and FIG. 8 is a schematic view showing the relationship between sensors incorporated in the load simulating apparatus of the present invention and the cycle controller.

DESCRIPTION OF THE PREFERRED EMBODIMENT

Figure 2:
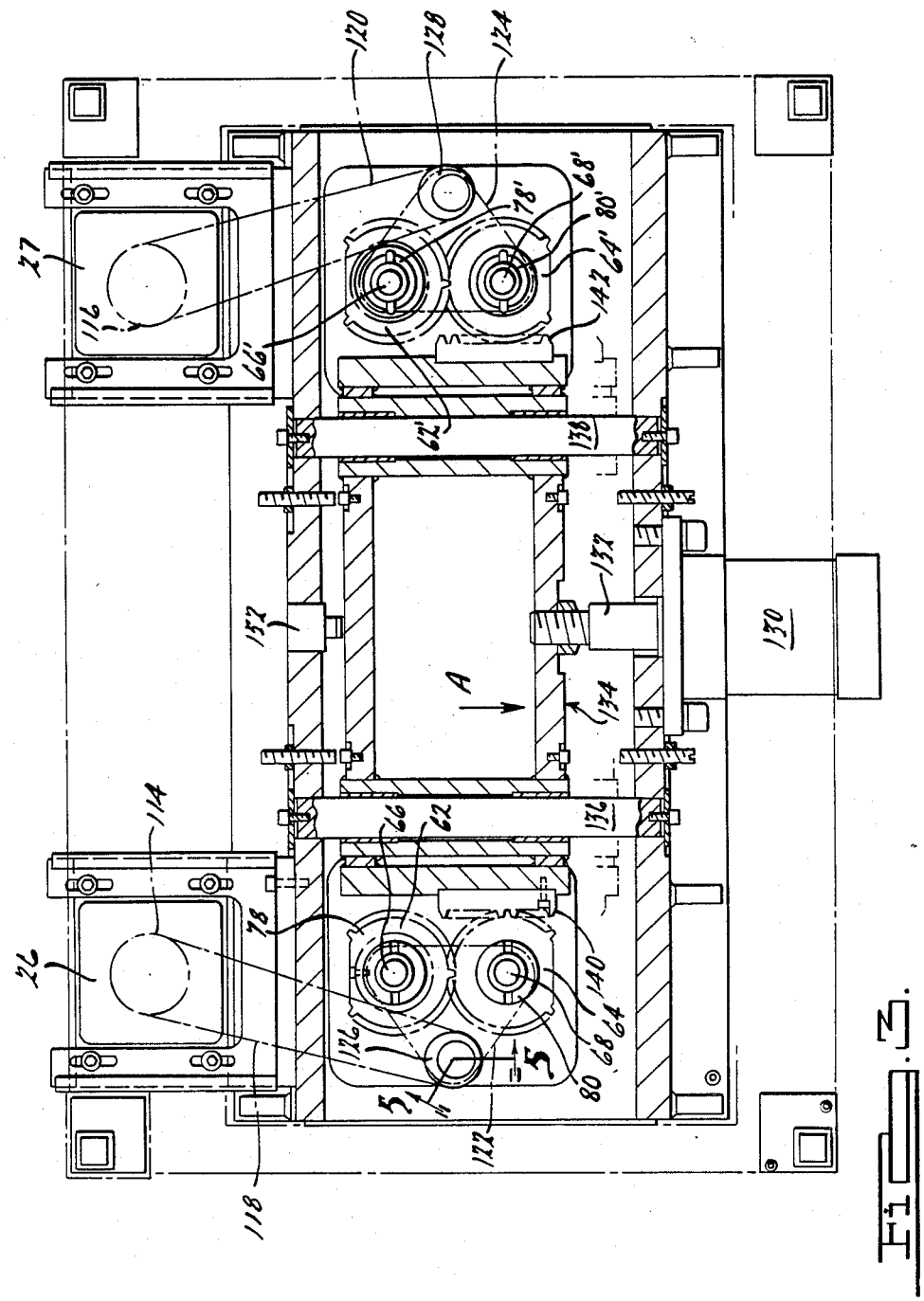
FIG. 2 is an end elevational view of the load simulating apparatus illustrated in FIG. 1.

Referring now to the drawings and more specifically to FIGS. 1 and 2 thereof, there is illustrated a load simulating apparatus for applying a radially inwardly directed load to a mounted and inflated wheel/tire assembly, said apparatus being indicated generally at 10. Load simulating apparatus 10 is designed as a separate stand alone component which can be easily integrated into existing wheel/tire assembly lines and comprises a supporting base 12 adapted to accommodate a through feeding lift and carry transfer apparatus 14. Supportingly secured to the supporting base are a plurality of preferably four pivotably mounted driving arm assemblies 16, 18, 20, 22 positioned in two groups of two each on opposite lateral sides of the lift and carry transfer apparatus 14. A pivot drive arrangement 24 is positioned below the lift and carry transfer apparatus 14 and centrally disposed so as to be operative to effect pivotable movement of all four arm assemblies 16–22 simultaneously and in synchronized relationship. A drive arrangement 26 is also incorporated in the lower portion of the supporting base and is operative to effect a rotatable driving motion of each of a plurality of four rollers 28, 30, 32, 34 one of which is associated with each of the respective arm assemblies 16–22. Additionally, a plurality of support rollers 36 are positioned in a generally circular arrangement between and on opposite lateral sides of the transfer bars 38, 40 forming a part of the lift and carry transfer apparatus 14. These rollers are substantially identical and are intended to support the wheel/tire assembly during the operational cycle of the load simulating apparatus. Preferably rollers 36 will be of generally cylindrical shape and positioned such that the rotational axis of each roller intersects the rotational axis of the other rollers at a common center point which will preferably be located substantially on the axis of rotation of the wheel/tire assembly being processed. Also, the radial positioning and length of rollers 36 will preferably be such as to accommodate a wide range of wheel/tire diameters such as for example from 13 inches to 17 inches.

As best seen with reference to FIG. 4, one pair 16, 18 of the arm assemblies 16, 18, 20, 22 will be described in greater detail. It should be noted at the onset that the two pairs of arm assemblies are substantially identical and accordingly only one such pair will be described in detail it being understood that the other arm assembly pair is substantially identical in terms of construction and operation as described herein with reference to arm assemblies 16, 18 and corresponding portions thereof have been indicated by like reference numbers primed where appropriate.

Arm assemblies 16 and 18 include a pair of substantially parallel upstanding generally cylindrically shaped elongated housings 42, 44 which are secured to a common supporting flange 46 in relatively closely spaced relationship. Hollow shafts 46, 48 are disposed within each of the cylindrical housing members and extend outwardly from both the upper and lower ends of respective housings 42 and 44. Suitable bearings 50 are provided between shafts 46, 48 and respective housings 42, 44 adjacent both the upper and lower ends thereof in order to enable relative rotational movement therebetween. Each of shafts 46 and 48 project outwardly from the upper ends of respective housings 42, 44 and include an enlarged diameter flange portion 52, 54 respectively to which oppositely laterally extending substantially identical arm members 56, 58 are secured such as by a plurality of suitable threaded fasteners 60. Suitable thrust bearings will preferably be interposed between the terminal end of respective housings 42, 44 and the lower surfaces of respective flange portions 52, 54.

The lower ends of respective shaft members 46 and 48 each extend through suitable openings provided in support flange 46 and have fixedly secured thereto substantially identical drive gear members 62, 64. Preferably, gear members 62, 64 are of a diameter relative to the positioning of the shafts such that they are in proper meshing relationship with each other.

Second rotational drive shaft members 66, 68 are also provided within each of the respective hollow pivot drive shaft members 46, 48 and are both of a length substantially greater than that of the pivot drive shafts 46, 48. Suitable bearings 69 are provided to rotatably support the upper and lower ends of shafts 66, 68 substantially coaxially within hollow shafts 46, 48 respectively. The upper ends of each of these rotational drive shafts 66, 68 extend outwardly into suitably formed recesses 70, 72 provided in the upper surface of respective outwardly extending arm members 56, 58. Suitable pulley members 74, 76 are secured to respective shafts 66, 68 and disposed within respective recesses 70, 72. The lower ends of each of these rotational drive shafts 66, 68 extend outwardly through the respective gear members 62, 64 secured to respective pivot drive shafts 46, 48 and each have a pulley member 78, 80 secured thereto.

As previously mentioned, each of the outwardly extending arm members 56, 58 incorporates a roller member 30, 28 which is fixedly secured to the respective depending shafts 82, 84, the upper ends of which have secured thereto suitable pulley members 86, 88 which are positioned within respective recesses 70 and 72. In order to insure rigid support for shafts 82, 84, each arm member 56, 58 has secured thereto a generally L-shaped depending flange portion 90, 92 which include openings 94, 96 respectively through which the lower ends of shafts 82, 84 project and are rotatably supported. Suitable gussets 98, 100 may also be provided to further reinforce and further rigidify the support for respective rollers 28, 30. A suitable flexible drive belt 102 extends between and around respective pulleys 74 and 86 so as to transfer rotational driving forces from shaft 66 to shaft 82 and hence roller 30. Similarly, and for the same reasons, drive belt 104 extends between and around pulleys 76 and 88 which are positioned within respective recesses 70 and 72. In order to insure a sufficient and desired tension is provided on drive belt in order to transmit the necessary driving force, idler pulleys 106, 108 are provided intermediate respective pulleys 86, 74 and 88, 76. Idler pulleys 106, 108 are each secured by means of eccentric pins 110, 112 to respective arms 56, 58 so as to enable them to be repositioned for tension adjustment should belts 102, 104 stretch during use as well as to facilitate replacement thereof. It should also be noted that preferably roller members 28, 30, 32 and 34 will all be slightly tapered such that the upper end is of a slightly larger diameter than the lower end. As best seen with reference to FIG. 6, the tapered configuration of rollers 28, 30, 32, 34 will operate to create a downward force component on the tire 105 to thereby urge the wheel/tire assembly in a direction toward support rollers 36. Preferably, this taper will be relatively small so as to exert a major force component on the tire directed generally radially inwardly so as to properly seat the tire bead on the wheel.

As best seen with reference to FIG. 3, in order to rotatably drive the respectively tapered roller members 28, 30, 32, 34, a pair of drive motors 26, 27 are positioned on the supporting structure adjacent opposite lateral sides thereof and also adjacent respective pairs of upwardly extending arm assemblies 16, 18 and 20, 22. Each of the drive motors 26, 27 incorporates a suitable pulley 114, 116 about each of which extends one of a pair of belt members 118, 120. The opposite end of respective belts 118, 120 extend around respective idler pulleys 126, 128 and operate to transfer the rotational driving forces thereto from motors 26 and 27 respectively. A second pulley 82 as best seen with reference to FIG. 5 is fixedly secured to pulley member 126 and rotatable therewith on a common shaft 83. Pulley 82 has a belt 122 extending therearound which in turn extends around both pulley 78 and 80 so as to thereby transmit rotational movement from idler pulley 126 to respective shafts 66 and 68. Similarly, belt 124 extends around a second pulley (not shown) associated in a like manner with idler pulley 128 and around respective pulleys 78' and 80' to transmit rotational movement from idler pulley 128 to shafts 66' and 68'. In order to provide for adjustment and to maintain a suitable tension on belt members 118, 120, 122, 124, idler pulleys 126, 128 and the associated shafts are preferably adjustably mounted on the supporting base 12 so as to enable a take up of any slack to be accomplished. It should be noted that motors 26 and 27 will preferably be of identical size and speed so as to rotatably drive all four roller members at virtually identical speeds thus avoiding any excessive wear and tear on the periphery of the wheel/tire assembly. Additionally, if desired, a single drive motor may be utilized in place of drive motors 26, 27.

In order to effect pivotable inward and outward movement of the arm members 56, 58, 56' and 58' and hence move the tapered roller members 28, 30, 32 and 34 into and out of engagement with the wheel/tire assembly, a suitable pivot drive arrangement 24 is provided which incorporates a suitable hydraulic or pneumatic cylinder member 130. The output shaft 132 of this cylinder is connected to a transfer carriage assembly 134 which is slidably supported on a pair of longitudinally extending rod members 136, 138 so as to allow for reciprocal movement thereof. A pair of rack members 140, 142 are suitably secured to outwardly projecting flange members provided on the opposite lateral sides of the reciprocating carriage assembly 134 which rack members 140, 142 are respectively positioned so as to engage one of the pivot drive gears 64, 64' provided at the lower end of the pivot drive shaft 48 forming a part of the upwardly extending arm assemblies 16, 18, 20, 22. As shown in FIG. 3, movement of carriage assembly 134 in the direction of arrow "A" will result in a clockwise rotation of gear 64 which in turn will effect a counterclockwise rotation of gear 62 as they are positioned in meshing engagement. Similarly and simultaneously, rack 142 will effect a counterclockwise rotation of gear 64' which will in turn effect a clockwise rotation of gear 62'. As both rack members 140, 142 are secured to the same carriage assembly 134 which is actuated in reciprocal motion by a single cylinder 130, the pivotable movement of all four arm assemblies 16, 18, 20, 22 will remain in synchronized relationship to each other.

Referring once again to FIG. 2, in order to insure the wheel/tire assembly is positively retained within the load simulating apparatus, a hold down foot 158 is provided which is rotatably secured to the end of a piston rod 160 of a suitable hydraulic or pneumatic cylinder 162. Hold down foot 158 is designed to extend downwardly upon actuation of cylinder 162 into engagement with the center spider portion of the vehicle wheel and to exert a biasing action urging tire 105 into engagement with rollers 36.

In operation, the lift and carry transfer bars 38, 40 will reciprocally operate to successively move wheel/tire assemblies into the work station of the load simulating apparatus 10 of the present invention. Once a wheel/tire assembly has been moved into the work station, the lift and carry apparatus will lower the sidewall of the tire down into engagement with the circular array of roller members 36 which will then operate to support the wheel/tire assembly within the work station as shown in FIG. 7. Next, the pivot drive arrangement 24 will actuate so as to cause an inward pivotable movement of each of the four arm assemblies 16, 18, 20, 22 thereby moving the tapered roller members 28, 30, 32, 34 into engagement with the periphery of the wheel/tire assembly and operating to insure positive centering thereof within the work station. By proper centering, it is meant that the axis of rotation of the wheel/tire assembly will substantially intersect the point at which the axis of rotation of each of the support rollers 36 intersect. Thereafter a slight reverse movement of the pivot drive arrangement will cause slight outward movement of the tapered roller assemblies whereupon drive motors 26, 27 will be actuated so as to bring the drive rollers 28, 30, 32, 34 up to full speed. Because of the cycle time required and the ability to utilize smaller drive motors, it is preferable to accelerate the rollers 28, 30, 32, 34 under no load condition although if desired, these rollers could be accelerated under partial or even full load conditions. At the same time, hold down foot 158 will be actuated into engagement with the vehicle wheel.

Next, the pivot drive arrangement 24 will be actuated to move each of the four rollers 28, 30, 32, 34 provided on respective arm assemblies 16, 18, 20, 22 generally radially inward into engagement with the periphery of the wheel/tire assembly whereupon the rapidly rotating rollers 28, 30, 32, 34 will operate to accelerate the wheel/tire assembly up to a predetermined desired speed. It should be noted that cylinder 130 of the pivot drive arrangement 24 will operate to exert a force such that rollers 28, 20, 32, 34 will bear against the periphery of the tire in such a manner as to simulate the vehicle load to which the tires will be subjected during actual operation of the motor vehicle once they are mounted thereon. This radially inwardly directed force from each of the four roller members 28, 30, 32, 34 will operate to slightly warm the tire much the same as the tire is warmed during operation of a motor vehicle with the resultant increase in flexibility of the tire as well as resulting in firm final seating of the bead of the vehicle tire. It is believed that this slight warming effect helps the tire to assume its intended and desired operational shape and to eliminate the distortions which may have set in as a result of the strapping and stacking of the tires during shipment and storage prior to assembly to the vehicle wheel.

In a preferred embodiment of the invention, it has been found that a speed of approximately 1500 rpm on the rollers 28, 30, 32, 34 will operate to drive the vehicle wheel at upwardly of approximately 40-45 miles per hour and the pivot drive arrangement 24 will be sized so as to enable each of the roller members to apply approximately a 500 pound radially inwardly directed force against the periphery of the tire. A 20 pound hold down force exerted by hold down foot 158 has been found to be sufficient to positively retain the wheel/tire assembly in position without exerting an excessive loading on the supporting rollers 36. It has been found that with this criteria the entire operational cycle can be accomplished in approximately 6 to 7 seconds with the entire acceleration and deceleration of the wheel/tire assembly from zero to 45 miles per hour back down to zero being accomplished in approximately four seconds. These time constraints are necessary in order to meet with the overall operating speed required of the wheel/tire assembly line.

It should also be noted that the load simulating apparatus 10 of the present invention is also provided with two pair of photocell detectors 144, 146, 148, 150 one of each pair being mounted on opposite lateral sides of the work station and being vertically spaced with one pair positioned above the other. The lower pair of photocell detectors 144, 146 is operable to detect the presence of a wheel/tire assembly within the work station whereas the upper pair of photocell detectors 148, 150 is operable to detect the presence of a "mini-spare". The reason for detecting the presence of a mini-spare is that these mini-spares are not subject to the balance cycle and hence there is no need to process them through the load simulating apparatus. Such mini-spares are intended for only very short duration usage to enable a vehicle encountering a tire failure to travel to a repair station.

In addition to these photocell detectors, the load simulating apparatus of the present invention is also provided with suitable sensor means such as switch 152 which is operable to provide an indication that the arm assemblies 16, 18, 20, 22 have pivoted inwardly more than a predetermined amount whereby cycle control means 154 may operate to abort the cycle. The reasons for providing this "abort upon excessive travel" means is to enable the load simulating apparatus to abort the cycle in the event a wheel/tire assembly is received in an uninflated condition or alternatively, a loss of inflation pressure is experienced during the operational cycle of the load simulating apparatus for any reason. In the event of either of these conditions the four arm assemblies 16, 18, 20, 22 will move radially inwardly with respect to the wheel/tire assembly a greater amount than would normally be anticipated and sensor means 152 will immediately operate signal this overtravel condition whereby cycle controller 154 may operate to retract the pivot drive arrangement thereby pivoting the four arm members 16, 18, 20, 22 radially outwardly out of engagement with the wheel/tire assembly so as to prevent possible damage to the tapered roller members and/or the wheel/tire components.

It has been found that use of this load simulating apparatus in a wheel/tire assembly line results in significant reductions in the amount of weight necessary to effect proper balancing of the wheel/tire assembly. Further additional cost savings are also realized from the significant reduction in the number of vehicles requiring rebalancing of the wheel/tire assemblies after a brief period of use.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A load simulating apparatus for applying a load on the periphery of a tire which has been mounted on a vehicle wheel and inflated to thereby insure seating of the tire bead on the vehicle wheel, said load simulating apparatus comprising:

means movable into engagement with said vehicle wheel and inflated tire to rotatably drive said vehicle wheel and inflated tire, said movable means including force applying means for applying a generally radially inwardly directed force on the periphery of said inflated tire to thereby insure seating of the tire bead on the vehicle wheel; and support means engageable with an axial side portion of at least one of said wheel and said tire for inhibiting axial movement of said wheel, said force applying means also being operative to exert an axially directed force on said wheel and said inflated tire in a direction toward said support means whereby said force applying means and said support means cooperate to restrain said wheel and said tire during rotation thereof.

2. A load simulating apparatus as set forth in claim 1 wherein said force applying means comprise a plurality of rollers spaced around the periphery of said tire and movable into and out of engagement therewith.

3. A load simulating apparatus as set forth in claim 2 wherein said rollers are axially elongated and rotatable about an axis positioned substantially parallel to the axis of rotation of said wheel.

4. A load simulating apparatus as set forth in claim 3 wherein said rollers are tapered in a single axial direction over substantially the entire tire engaging portion thereof so as to exert said axially directed force on said tire in a direction to urge said wheel and said tire toward said support means.

5. A load simulating apparatus as set forth in claim 1 wherein said support means are of a size to accommodate tires of different diameters.

6. A load simulating apparatus as set forth in claim 1 wherein said movable means include motor means operative to rotatably drive said force applying means whereby said force applying means also operates to rotate said tire and said wheel.

7. A load simulating apparatus as set forth in claim 6 wherein said force applying means comprise a plurality of rollers spaced around the periphery of said tire and movable into and out of engagement therewith.

8. A load simulating apparatus as set forth in claim 7 wherein said plurality of rollers are rotatably supported on arm assemblies for movement into and out of engagement with said tire.

9. A load simulating apparatus as set forth in claim 1 wherein said support means include a plurality of rollers supportingly engageable with an axial side portion of one of said wheel and said tire.

10. A load simulating apparatus as set forth in claim 9 wherein said supporting rollers are axially elongated and positioned in circumferentially spaced relationship such that the axis of rotation of each of said plurality of rollers intersects at a substantially common point, said point lying substantially on the axis of rotation of said wheel and said tire.

11. A load simulating apparatus as set forth in claim 10 wherein said plurality of rollers supportingly engage the sidewall of said tire.

12. A load simulating apparatus as set forth in claim 10 further including hold down means engageable with one of said wheel and said tire on the other axial side thereof, said hold down means being operative to urge said wheel tire assembly toward said plurality of rollers.

13. A load simulating apparatus as set forth in claim 1 wherein said apparatus further incorporates means for sensing an uninflated condition of said tire, said means being operative to discontinue application of said radially inwardly directed force in response to said sensed condition.

14. A load simulating apparatus for applying a load to a mounted and inflated vehicle wheel/tire assembly to thereby insure seating of the tire bead on the vehicle wheel, said load simulating apparatus comprising:

a first plurality of roller means positioned within a work station for supportingly engaging a wheel/tire assembly within said work station;

movable means including a second plurality of roller means positioned within said work station and movable into and out of engagement with the periphery of a wheel/tire assembly located within said work station and applying a generally radially inwardly directed force thereon and to apply an axially downwardly directed force thereon to urge said tire and associated wheel into engagement with said first plurality of roller means, hold down means supported in axially spaced relationship to said wheel and reciprocatingly movable toward said wheel/tire assembly to exert a generally axially directed force on said wheel/tire assembly to maintain said wheel/tire assembly in engagement with said first plurality of rollers; and said movable means further including drive means operative to rotationally drive said wheel/tire assembly while said second plurality of rollers exert said directed force thereon to thereby insure seating of the tire and bead on the vehicle wheel.

15. A load simulating apparatus as set forth in claim 14 wherein each of said second plurality of rollers is rotatably supported on an arm assembly, said arm assemblies being pivotably supported on a mounting base and including pivot drive means for effecting movement of said roller means.

16. A load simulating apparatus as set forth in claim 15 wherein said pivot drive means is operative to simultaneously pivotably drive each of said arm assemblies in synchronization.

17. A load simulating apparatus as set forth in claim 14 wherein said drive means includes motor means operative to rotatably drive each of said second set of roller means.

18. A load simulating apparatus as set forth in claim 14 wherein said hold down means comprise a rotatably supported member axially movable into and out of engagement with said wheel/tire assembly.

19. A load simulating apparatus as set forth in claim 14 wherein said first plurality of rollers are axially elongated whereby they are able to accommodate wheel/tire assemblies of different diameters and are positioned in circumferentially spaced relationship such that the axis of rotation of each of said rollers intersects at a substantially common point, said point lying substantially on the axis of rotation of said wheel/tire assembly.

20. A load simulating apparatus as set forth in claim 14 wherein said apparatus further includes means for sensing an uninflated condition of said wheel/tire assembly and moving said second plurality of rollers out of engagement with said wheel/tire assembly in response to said sensed condition.

21. A load simulating apparatus for applying a load to the periphery of a tire which is in an inflated condition and mounted on a vehicle wheel to thereby insure seating of the tire bead on the vehicle wheel, said apparatus comprising:

a supporting base;

a first plurality of roller means rotatably supported on said supporting base and disposed in a circumferentially spaced circular array, said first roller means being adapted to support said wheel and said tire;

a plurality of arm assembly means pivotably supported on said supporting base, each of said arm assembly means including driving roller means rotatably supported thereon, said arm assembly means being operative to pivotably move each of said driving roller means into and out of engagement with the periphery of said tire and to apply a radially inwardly directed force thereon and to apply a generally axially directed force thereon to urge said tire and associated wheel into engagement with said first plurality of roller means;

pivot drive means operative to effect synchronized simultaneous pivotal movement of each of said arm assembly means; and rotational drive means operative to rotatably drive said driving rollers, said driving rollers in turn being adapted to rotationally drive said tire and said associated wheel while said radially directed force is applied thereto to thereby insure seating of the tire bead on the vehicle wheel.

22. A load simulating apparatus as set forth in claim 21 wherein said pivot drive means is operative to advance said driving roller means into engagement with the periphery of said tire to center said wheel and said inflated tire with respect to said roller means, said pivot drive means being operative to thereafter retract said driving roller means from engagement with said tire while said rotational drive means accelerates said driving roller means and thereafter to advance said driving roller means into engagement with said tire to rotationally drive same and to apply a generally radially inwardly directed load thereon.

23. A load simulating apparatus as set forth in claim 21 wherein said apparatus includes sensing means operative to sense an uninflated condition of said tire and to effect pivotable movement of said driving roller means out of engagement with said tire in response to said sensed condition.

24. A load simulating apparatus as set forth in claim 21 wherein said apparatus further includes hold down means rotatably supported on said supporting base, said hold down means being operative to urge said tire and said wheel into engagement with said first plurality of rollers.

25. A load simulating apparatus as set forth in claim 21 wherein said driving roller means are tapered so as to exert said axial force on said tire to urge said tire and said wheel toward said first plurality of roller means.

* * * * *

UNITED STATES PATENT AND TRADEMARK OFFICE
CERTIFICATE OF CORRECTION

PATENT NO. : 4,886,101

DATED : December 12, 1989

INVENTOR(S) : John F. Kinnick et al

It is certified that error appears in the above-identified patent and that said Letters Patent is hereby corrected as shown below:

Column 9, line 25, Claim 14,
after "said" insert --radially inwardly--.

Signed and Sealed this

Twentieth Day of November, 1990

Attest:

HARRY F. MANBECK, JR.

*Attesting Officer*   *Commissioner of Patents and Trademarks*